(12) United States Patent
Carpenter et al.

(10) Patent No.: US 8,788,319 B2
(45) Date of Patent: Jul. 22, 2014

(54) SOCIAL CONTEXT MONITOR

(75) Inventors: Bradley L. Carpenter, Carnation, WA (US); Garrett R. Vargas, Sammamish, WA (US); Krista L. Johnson, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 11/323,561

(22) Filed: Dec. 30, 2005

(65) Prior Publication Data

US 2007/0156522 A1   Jul. 5, 2007

(51) Int. Cl.
*G06Q 30/00* (2012.01)
(52) U.S. Cl.
USPC .......................................................... 705/14
(58) Field of Classification Search
USPC ............ 705/14, 10, 500; 707/3, 102; 709/218
See application file for complete search history.

(56) References Cited

U.S. PATENT DOCUMENTS

| | | | |
|---|---|---|---|
| 5,283,731 A | 2/1994 | Lalonde et al. | |
| 5,671,428 A | 9/1997 | Muranaga et al. | 715/751 |
| 5,740,549 A | 4/1998 | Reilly | |
| 5,848,396 A * | 12/1998 | Gerace | 705/10 |
| 5,848,397 A | 12/1998 | Marsh et al. | |
| 6,009,410 A | 12/1999 | LeMole et al. | |
| 6,442,529 B1 | 8/2002 | Krishan et al. | 705/14.52 |
| 6,687,878 B1 | 2/2004 | Eintracht et al. | 715/201 |
| 6,829,780 B2 | 12/2004 | Kraft | |
| 6,847,969 B1 | 1/2005 | Mathai et al. | |
| 6,912,505 B2 | 6/2005 | Linden et al. | |
| 7,069,308 B2 * | 6/2006 | Abrams | 709/218 |
| 7,130,861 B2 | 10/2006 | Bookman et al. | |
| 7,158,986 B1 | 1/2007 | Oliver et al. | 1/1 |
| 2001/0020236 A1 | 9/2001 | Cannon | |
| 2002/0026360 A1 * | 2/2002 | McGregor et al. | 705/14 |
| 2002/0032608 A1 | 3/2002 | Kanter | |
| 2002/0087573 A1 * | 7/2002 | Reuning et al. | 707/102 |
| 2002/0138607 A1 | 9/2002 | O'Rourke et al. | |
| 2002/0147645 A1 * | 10/2002 | Alao et al. | 705/14 |
| 2003/0050929 A1 | 3/2003 | Bookman et al. | |
| 2003/0070167 A1 | 4/2003 | Holtz et al. | |
| 2003/0087652 A1 | 5/2003 | Simon et al. | |
| 2003/0115272 A1 | 6/2003 | Muttitt et al. | |
| 2003/0191689 A1 * | 10/2003 | Bosarge et al. | 705/14 |

(Continued)

FOREIGN PATENT DOCUMENTS

| | | |
|---|---|---|
| EP | 1217560 | 6/2002 |
| WO | WO-0058897 | 3/2000 |

(Continued)

OTHER PUBLICATIONS

Smith, S., "Classmates: The Power of 'Whatever Happened to . . . ?'", Online: a Division of Information Today Inc. 1998-2005, http://www.econtentmag.com/Articles/ArticleReader.aspx?ArticleID=883&ContextSubtypeID=8.

(Continued)

*Primary Examiner* — Saba Dagnew
(74) *Attorney, Agent, or Firm* — Steve Wight; Carole Boelitz; Micky Minhas (57) ABSTRACT

The method tracks keywords about a non-user of a computer and stores it in various contact profiles. The keywords in the contact profiles can be compared to stored content and content related to the keywords in the contact profile may be communicated to the user.

18 Claims, 5 Drawing Sheets

(56) References Cited

U.S. PATENT DOCUMENTS

| | | | |
|---|---|---|---|
| 2004/0002896 A1* | 1/2004 | Alanen et al. | 705/14 |
| 2004/0098449 A1 | 5/2004 | Bar-Lavi et al. | |
| 2004/0117255 A1 | 6/2004 | Nemirofsky et al. | |
| 2005/0033771 A1 | 2/2005 | Schmitter et al. | |
| 2005/0080665 A1 | 4/2005 | Bowman-Amuah | |
| 2005/0080775 A1 | 4/2005 | Colledge et al. | |
| 2005/0097440 A1 | 5/2005 | Lusk et al. | 715/500.1 |
| 2005/0177385 A1 | 8/2005 | Hull et al. | |
| 2005/0197846 A1* | 9/2005 | Pezaris et al. | 705/1 |
| 2005/0209874 A1 | 9/2005 | Rossini | |
| 2005/0216336 A1 | 9/2005 | Roberts et al. | |
| 2005/0256781 A1 | 11/2005 | Sands et al. | |
| 2006/0053195 A1 | 3/2006 | Schneider et al. | |
| 2006/0080166 A1 | 4/2006 | Takahashi | |
| 2006/0080432 A1 | 4/2006 | Spataro et al. | |
| 2006/0116926 A1 | 6/2006 | Chen | |
| 2006/0136393 A1* | 6/2006 | Abbott et al. | 707/3 |
| 2006/0218164 A1 | 9/2006 | Shinmura et al. | 707/100 |
| 2006/0282762 A1 | 12/2006 | Diamond et al. | |
| 2007/0186171 A1 | 8/2007 | Junuzovic et al. | |
| 2008/0249997 A1 | 10/2008 | Sun et al. | |
| 2008/0256114 A1 | 10/2008 | Rasmussen et al. | 707/102 |
| 2009/0077584 A1 | 3/2009 | Glasgow et al. | |
| 2009/0164912 A1 | 6/2009 | Barber et al. | |
| 2009/0254842 A1 | 10/2009 | Leacock et al. | |
| 2010/0058201 A1 | 3/2010 | Harvey et al. | 715/753 |
| 2010/0306004 A1 | 12/2010 | Burtner et al. | 705/8 |
| 2010/0306676 A1 | 12/2010 | Srinivasaraghavan et al. | 715/758 |
| 2011/0099006 A1 | 4/2011 | Sundararaman et al. | 704/208 |
| 2011/0185006 A1 | 7/2011 | Raghav et al. | |
| 2011/0252312 A1 | 10/2011 | Lemonik et al. | |
| 2011/0252339 A1 | 10/2011 | Lemonik et al. | |

FOREIGN PATENT DOCUMENTS

| | | |
|---|---|---|
| WO | 0109771 | 2/2001 |
| WO | WO-0122261 | 3/2001 |
| WO | WO-0217202 | 2/2002 |

OTHER PUBLICATIONS

"Learn About WhenU," WhenU.com, Inc. 2005, http://www.whenu.com/learn.html.

"The Four Types of Contextual Advertising," http://searchviews.com/archieves/2005/08/the_four_types.php.

U.S. Appl. No. 11/358,286 Prosecution history including: Amendment filed Jun. 23, 2011; Non-final Rejection mailed Mar. 23, 2011; RCE and Amendment filed May 17, 2010; Examiner Interview Summary dated Apr. 20, 2010; Final Rejection mailed Mar. 24, 2010; Amendment filed Jan. 26, 2010; Non-Final Rejection mailed Oct. 26, 2009; Amendment and RCE filed Jul. 6, 2009; Final Rejection mailed Feb. 17, 2009; Amendment filed Dec. 9, 2008; Non-Final Rejection mailed Sep. 11, 2008; Preliminary Amendment filed Mar. 13, 2006; Application and filed Feb. 21, 2006.

"Learn About WhenU", WhenU.com, Inc. 2005, http://www.whenu.com/lear.html. 2 pages.

"The Four Types of Contextual Advertising," http://searchviews.com/archieves/2005/08/the_four>types.php. 4 pages.

"Marchex Acquires IndustryBrains, a Provider of Highly Targeted Online Traffic and Contextual Advertising Solutions," IndustryBrains 2006, http://www.industrybrains.com/press/072705.aspx. 3 pages.

"Contextual Advertising, Content Targeted Ads—ContextAd from ContextWeb," ContextWeb, Inc. http://www.contextweb.com/Corporate/contextad/contextad.shtml. 2 pages.

"Google AdSense-Overview," Google 2005, https://www.google.com/adsense/afc-online-overview. 3 pages.

"Content Match TM," Overture Services Limited 2005. http://www.content.overture.com/d/UKm/ac/pr/cm.jhtml. 3 pages.

Yau et al., "Context-Sensitive Middleware for Real-Time Software in Ubiquitous Computing Environments," IEEE, Inc. 2001. http://csdl2.computer.org/persagen/DLAbsToc.jsp?resourcePath=/dl/proceedings/&toc=comp/proceedings/isorc/2001/1089toc.xml&DOI=10.1109/ISORC.2001.922833. 2 pages.

U.S. Appl. No. 11/358,286 Non-Final Rejection mailed Aug. 23, 2013; Amendment and RCE filed Nov. 7, 2011; Final Rejection mailed Aug. 26, 2011.

"International Search Report", Mailed Date: Apr. 30, 2013, Application No. PCT/US2013/021354, Filed Date: Jan. 14, 2013, pp. 9. (MS# 335043.02).

Conner et al. "Office 2010 the missing manual", 2010, O'Reilly Media, Inc. 29 Pages.

Walkenbach et. al., "Microsoft Office 2010 Bible", 2010, Wiley Publishing, Inc., 23 Pages.

Mitchell, Alex, "Communication and Shared Understanding in Collaborative Writing", Retrieved at <<http://citeseerx.ist.psu.edu/viewdoc/download?doi=10.1.1.130.8683&rep=rep1&type=pdf>>, 1996, pp. 174.

Moran, et al., "Document Presence Notification Services for Collaborative Writing", Retrieved at <http://ieeexplore.ieee.org/stamp.jsp?tp=&arnumber=951994>, Seventh International Workshop on Groupware (CRIWG), Sep. 6-8, 2001, pp. 125-133.

U.S. Appl. No. 13/352,359 Amendment filed Sep. 16, 2013; Non-Final Rejection mailed May 13, 2013; Drawings and Application filed Jan. 18, 2012.

Amendment filed Nov. 25, 2013 for U.S. Appl. No. 11/358,286, 14 pages.

Final Office Action dated Dec. 27, 2013 for U.S. Appl. No. 11/358,286, 23 pages.

* cited by examiner

SOCIAL CONTEXT MONITOR

BACKGROUND

Vast amounts of data are created by users of computers. In a separate application meant to retrieve content for the consumption of the user, this information can be harvested to provide relevant content. But not all of this data is related to work or directly to the user. Sometimes, this data may be related to other non-users of the computer.

SUMMARY

The method tracks keywords about a non-user of a computer and stores it in various contact profiles. The keywords in the contact profiles can be compared to stored content (such as advertisements) and content related to the keywords in the contact profile may be communicated to the user. These can be used to serve content, such as advertisements that relate to the non-user of the system. The keywords for a contact profile can be viewed, reviewed, updated and modified by the user of the method. Advertisements can be served based on time, by request or based on updates to a contact profile.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
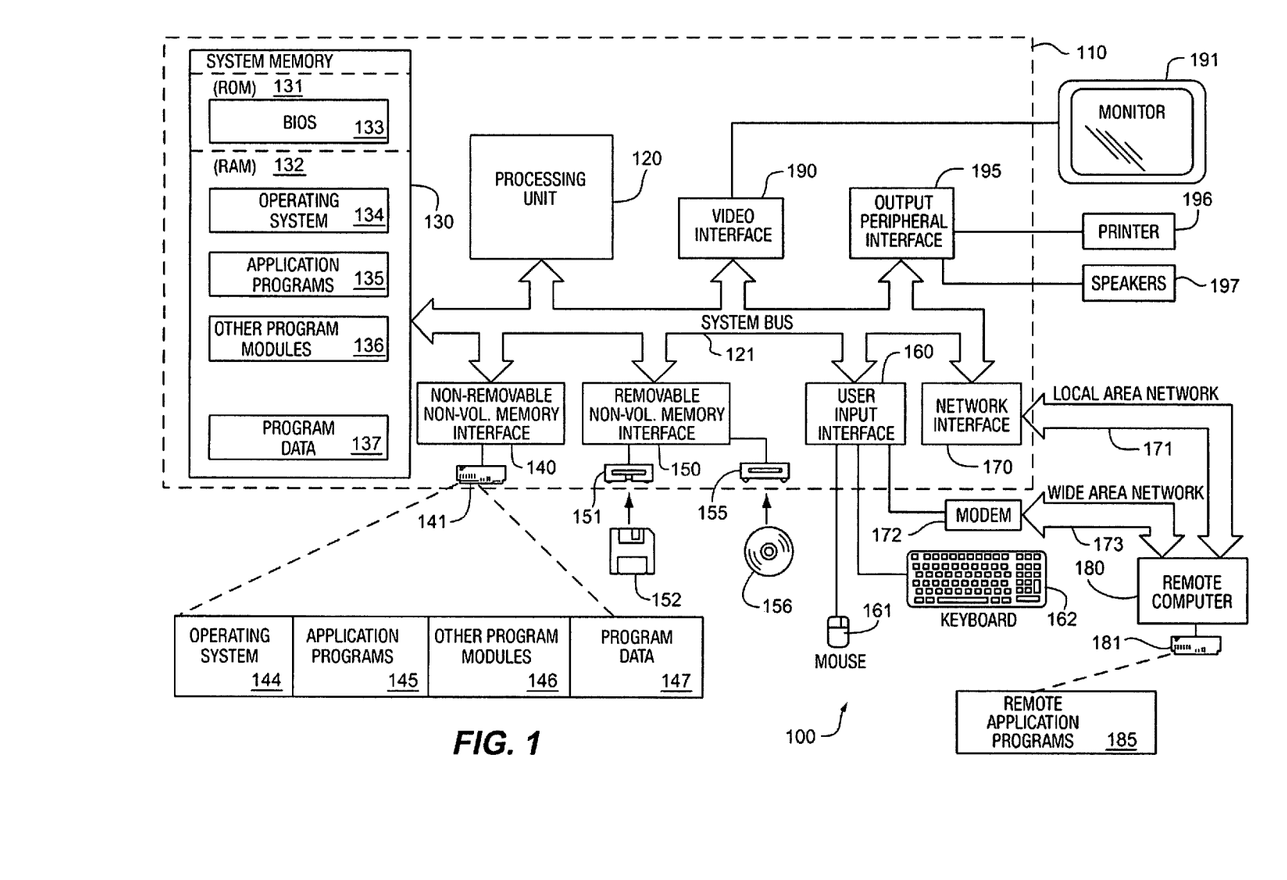
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Information is available on a PC today and web based activities that contain all kinds of data about the user(s) of the computer. The focus of the method focuses on profiling the social activities of the user that include building local profiles of the user's social circle to help serve targeted ads relative to this circle which will act on a timely and relevant fashion.

Figure 2:
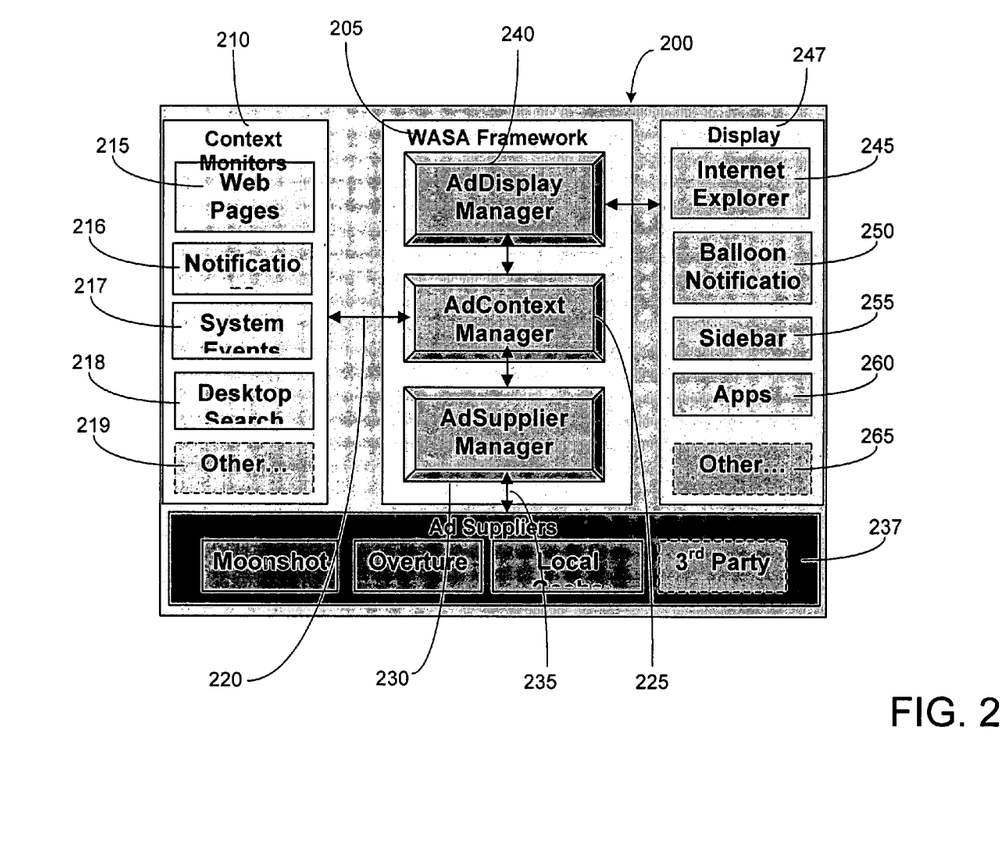
FIG. 2 may illustrates a framework in which the method may operate.

FIG. 2 may illustrates a framework 200 in which the method may operate. A central piece may be the core framework 205 with components that manage different plug-ins. The components may be accomplished in software, hardware or a combination of both software and hardware. The best way to explain how these pieces work together is via a walk-through of how an advertisement might be served to the user:

1. The user opens a webpage in an internet browser such as Internet Explorer. There is a context monitor 210 associated with Internet Explorer registered with the framework. The context monitor may monitor web pages 215, notifications 216, system events 217, desktop searches 218 or other events 219 for content that may be of interest as will be explained later. For example, a monitor specific to Internet Explorer 210 may pull a keyword of "music" (for example) out of the webpage 215.

2. An event may be created consisting of the keyword ("music") and the associated event that triggered that keyword (navigating to a webpage 215). This event may be communicated 220 to the Context Manager 225.

3. The Context Manager 225 may review at the various events communicated 220 from all installed plug-ins and communicate them to the Content Manager 230 to request relevant content (typically an advertisement) to be displayed to the user.

4. The Content Manager 230 may review the content of the event and may query 235 the installed content providers 237 to get some content that matches this keyword. The Content Manager 230 may optionally have logic to determine a ranking of which pieces of content may be best to display to the end user (since it may be combining content from different sources), or to filter that content based on the actual event associated with the keyword.

5. The Content Manager 230 may communicate 235 the list of retrieved content back to the Context Manager 225, which then may pass them on to the Display Manager 240.

6. The Display Manager 240 may look at the event associated with the content and uses that information to determine where this piece of content should be displayed. In this example, if Internet Explorer 245 has also registered a Display Client plug-in into the architecture, the content may be given to that Display Client. Other notifications or displays 247 are possible such as balloon notifications 250, sidebar notifications 255, application notifications 260 or other notifications 265.

Because each of the Context Monitors, Display Clients, and Content Providers registers separately with the core Framework, it may be appreciated that different configurations are possible. For example in the Widows operating system, the Windows SKU installed by the user or by the individual applications installed by the user may guide the configuration. For example, the Internet Browsing 215, Notifications 216, and System Events 217 Context Monitors may be grouped together indicating that these monitors might be a base-line set of Context Monitors installed on a system. If the user installs a subsidized version of Word, an additional Monitor may be installed at that point in time. Only the core framework (the Context Manager 225, Display Manager 240, and Content Manager 230) may be present in core operating system, such as Windows.

Figure 3:
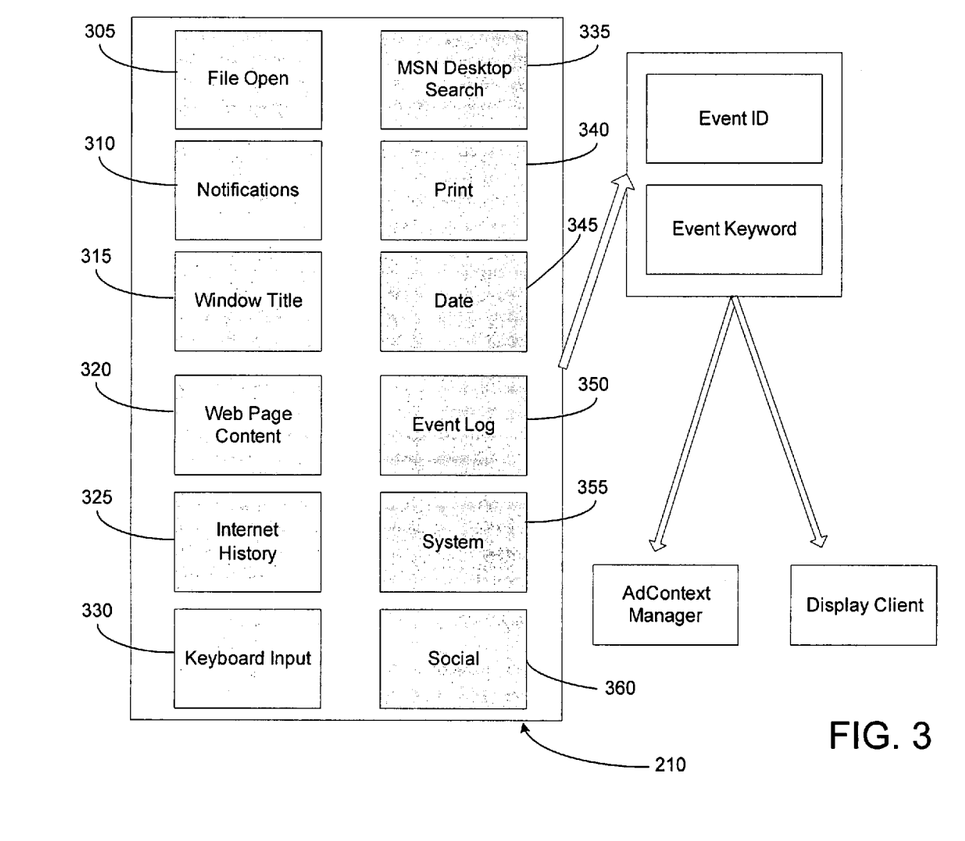
FIG. 3 may illustrate some sample context monitors.

Several context monitors 210 have been contemplated. FIG. 3 may illustrate some sample context monitors 210. The list of context monitors 210 is exemplary and this list is intended to provide a sample list of potential context monitors 210. It is not intended to be a complete list.

1. File Open 305

FileOpen 305 may be a context monitor 210 that may detect when any type of file is opened, therefore initiating an event. This monitor may be able to key in on immediate tasks the user is participating in therefore increasing the relevancy in providing ads based on user activity. When a file is opened, an action is taking place at the current time by the user of the PC, who is the intended recipient of the targeted ads. This context monitor 210 may mine information that exists in the file that the user has opened up and determine relevant keywords that should be sent to the Context Manager 225 (FIG. 2). Since this context monitor 210 may be part of the operating systems such as the Windows shell, it may behave independent of the application opening the file (assuming it is a file format the context monitor understands).

2. Notifications 310

Notifications 310 occur based on certain events that occur on a system and also contain information that is being provided to the user of the PC. Certain examples of notifications include "Printer cartridge is running low" or "Hard disk space is getting full." With this context monitor 210, keywords may be mined based on the current activity of the system or user to help provide relevant and targeted content.

3. Title 315

The title 315 of an object may have the highest relevancy of information in a particular document or article instead of scanning through the entire contents of a document or article. For example, in Windows, the Windows Title context monitor 210 may be able to obtain keywords from the Window Title, whether it's a document or web page in order to provide relevant content.

4. Web Page Content 320

Web pages 320 that the user of a PC is visiting may provide information on what the user is interested, therefore helping to provide keywords that may serve content relevant to the user interests and needs. This context monitor 210 may be able to obtain keywords from text in webpages based on the current webpage being viewed.

5. Internet History 325

The Internet History 325 Context Monitor 210 may be able to mine information from previously visited web pages and searches to determine appropriate keywords that may be relevant to a user. The History may be able to combine and sort from a large amount of information based on past actions.

6. Keyboard Input 330

Key strokes 330 typed by the user may be used to provide keywords inputted by the user regardless of which application they are using. This monitor 210 may need to be intelligent enough to separate words based on spaces and punctuation, and may need to pay attention to backspaces, deletes, and mouse movements (particularly if the user moves the insertion point in an edit control) to make sure that it records words correctly. This monitor 210 may be an active monitor 210 in that it will capture keywords while the user is actively using the computer. Internet or desktop searches 335 may also be reviewed by tracking keystrokes.

7. Print 340

The Print 340 Context Monitor 210 may be able to determine when and which document is being printed. When a document is being printed, it may mean the user has actively determined the information in there is of interest. By keying into this function, this context monitor 210 may be able to scan information in the documents that are being printed to help return targeted content.

8. Date 345

The Date 345 context monitor 210 may specifically look for items with recent activity, and dates and events that could provide relevant targeted content. Items that are recently used may be of most interest to the end user and may aid in serving relevant and useful content. In addition to just looking at recent activity, the date 345 context monitor 210 may detect patterns of activity by date with certain documents. For example, if the CHRISTMASCARDLIST.xls is updated every year in the November timeframe, the date context monitor may detect this, and when November comes around the following year, an appropriate keyword may be determined to serve content.

9. Event Log 350

The Event Log 350 context monitor 210 may mine the user's event log to determine which components might be failing or in need of repair, and could serve up content for either technicians or replacement parts. In the event of a catastrophic error, this monitor 210 may serve a cached ad for a repair service (for example, if a user boots into a safe operating system mode such as Windows Safe Mode).

10. System 355

The System 355 context monitor 210 may mine various system events such as boot time, CPU usage, current hardware, printer ink remaining, etc. and may use that to provide keywords that may be relevant to the user. If, for example, the user has a pattern of logging in at midnight each night, a keyword for "insomnia" may be triggered.

11. Social 360

The social 360 context monitor 210 may specifically not mine information about the user, but about all non-user entities that are determined relevant to the user. A local profile may be built based on each entity. This profile may be built from any context mining that is already being done, but may be looking for non-user profiling. As an example, a user may email her brother frequently and exchange information with him on a regular basis. His email address is ralph@math.utexas.edu and resolves to Ralph Kramden. The social 360 context monitor 210 would mine the name Ralph Kramden, and start to build a profile based on what was done with his name on her computer. Over time, this monitor might pick up the date of his birthday, special events, interests, graduation, hard times, etc. Alternatively, if the user had set up contacts with birthday or anniversary information in Outlook or Hotmail, this information may be pulled from those sources FIG. 4 may be an illustration of the structure of the social 360 context monitor 210. The main differentiators of the social 360 context monitor 210 are that the social profiles that are built and remain local to the machine that may be independent of the user preferences and behavior, and the user interaction capability that exists with the social 360 context monitor 210.

Figure 4:
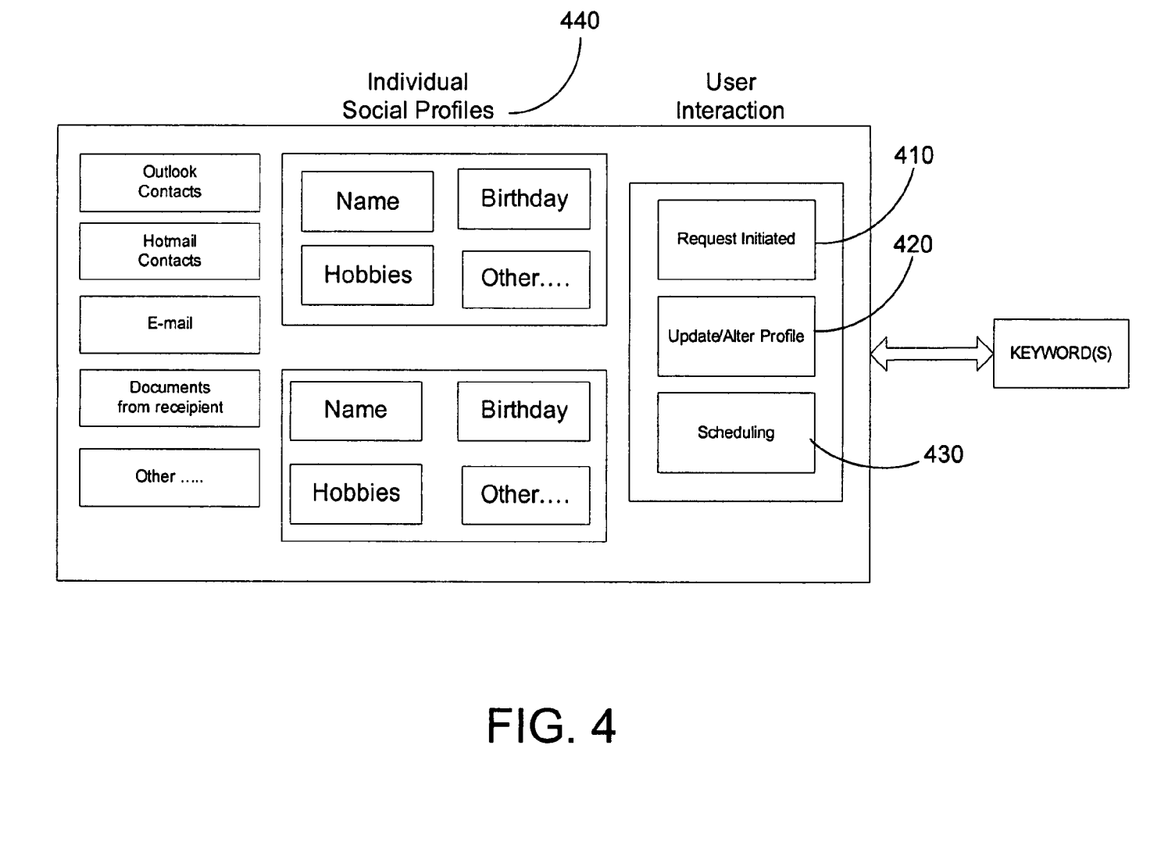
FIG. 4 may be an illustration of the structure of the social 360 context monitor.

The social 360 context monitor 210 may specifically not mine information about the user, but all non-user entities that are determined relevant to the user. A local profile may be built based on each entity. This profile may be built from any context mining that is already being done, but will be looking for non-user profiling.

Once the social 360 context monitor 210 is able to determine specific dates and events relative to this profile, the monitor 210 may categorize the information, and then determine the appropriate keyword to send to the Content Manager 225 (FIG. 2) to obtain relevant content (typically ads) to display to the user with respect to the social profile. Once the content is returned, it may be displayed 247 to the user interface with a determined display client to and may include a header notification to indicate this content is for a birthday that is coming soon of a close friend or family member and contain a link to products that this profile might be interested. For example, if a user receives several e-mails from Ralph about golfing or fishing, the user would likely be served content related to those sports.

In addition to this being a unique approach to serve content to a user for someone other than themselves, this context monitor may also be initiated directly by the user. FIG. 4 may illustrate the various events that may be used by the social 360 context manager 210 and the different ways in which keywords may be accessed, either by the method or the user. Because this context monitor will provide useful content in a timely manner about a user's social network, the user may find value in being able to refine the results returned from this content monitor. It can be appreciated that allowing this customization is in the best interest of the entity serving the content as well, as more targeted content will typically translate to greater revenue for that entity. The user may always have access 410 to this profile information and may edit the information at any time. This may allow the user to either add a new social profile for a contact that was not able to be determined from mining, and may also allow further refinement of the individual's interests that the method may have determined 420. Should the user want to initiate a search for a birthday present, the user may activate the local profile tool and populate it with the appropriate information. The information may then be used by the monitor to send keywords to the ad server to obtain targeted content. In addition, dates, such as birthdays may be scheduled 430 occasions when the method may update keywords related to a non-user.

Once the content was returned, another unique attribute of the social 360 context monitor 210 would be the ability for the user to see what keywords that were used to return the content as well as the updating the local profile information, regardless of whether or not this action was initiated by the user, or by the social 360 context monitor 210.

Figure 5:
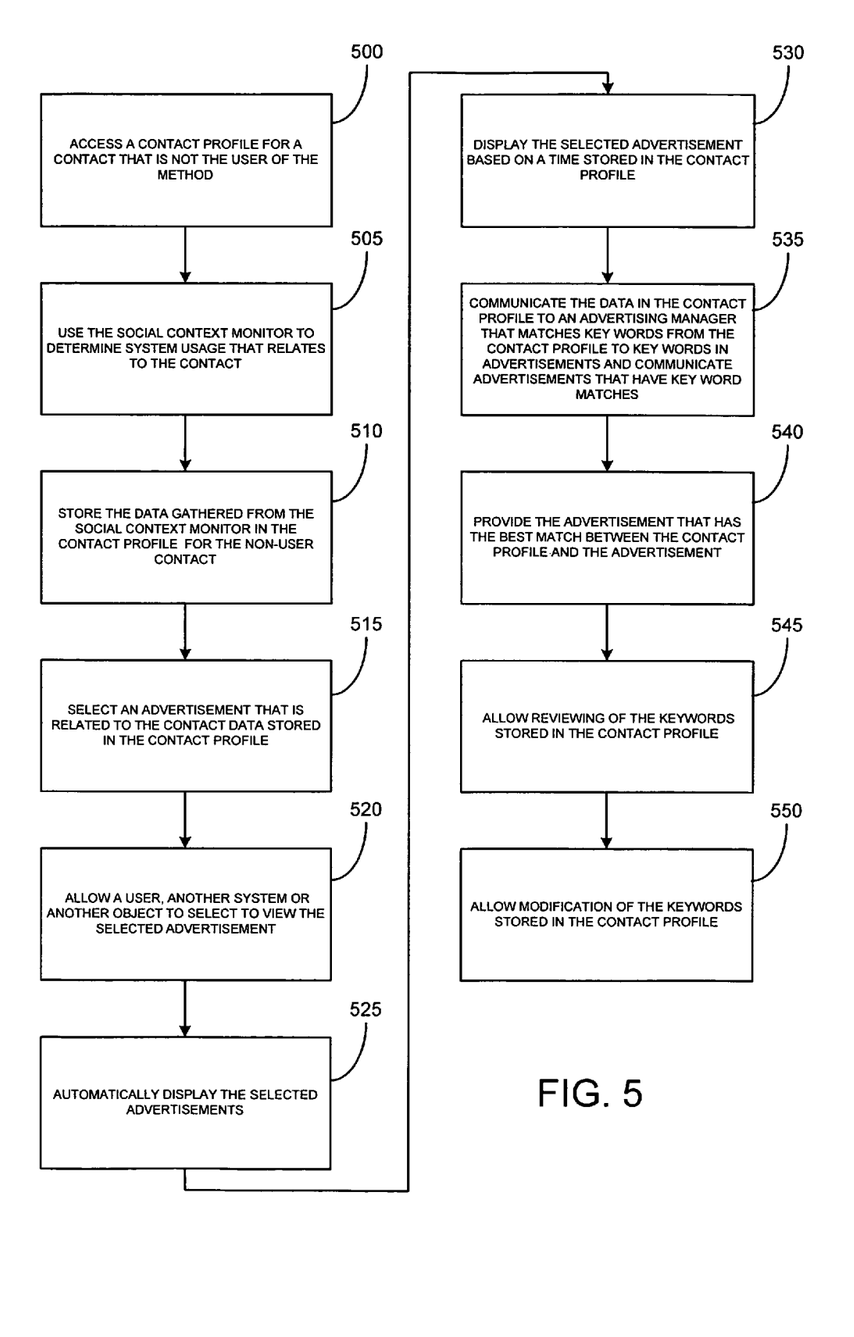
FIG. 5 may be a flowchart in accordance with a method where a user of the social 360 context manager 210 may access (or create if needed) a profile for a contact that is not a user of the method.

FIG. 5 may be a flowchart in accordance with a method where a user of the social 360 context manager 210 may access (or create if needed) a profile for a contact that is not a user of the method. The social 360 context manager 210 may be part of an operating system or may be a web-based application. At block 500, the method may access a contact profile 440 (FIG. 4) for a contact that is not the user of the method. For example, the social 360 (FIG. 3) context monitor 210 may create or access an already existing contact profile 440 (FIG. 4) for a user's brother.

At block 505, the method may use the social 360 context monitor 210 to determine system usage that relates to the contact. As previously explained, the method may have numerous places to look for information such as files that were opened, notifications that were received, title of applications of documents, web page content, internet history, keyboard input, printed documents, dates, event logs and system events. Some of these places may be more relevant than others. For example, rarely will system events be related to non-user.

At block 510, the data gathered from the social 360 context monitor 210 may be stored in the contact profile 440 (FIG. 4) for the non-user contact. The contact profile 440 may be any type of file, including, for example, an XML file, a text file, etc.

At block 515, the method may select content that is related to the contact data stored in the contact profile 440. For example, if the contact profile 440 indicates that a user likes tennis, content related to tennis may be selected. In addition, if there is no tennis-related content, the method select similar content such as for racketball equipment.

At block 520, the method may allow a user, another system or another object to select to view the selected content. At times, a user may desire to see content for a contact, such as near a holiday, a birthday or a visit. Thus, the user may select to see content related to a contact.

At block 525, the method may automatically display the selected content. For example, five days before a contact's birthday, content may be displayed with possible present ideas. In some embodiments, the content returned will be advertisements, and the use of the computer may be subsidized in exchange for the user viewing advertisements and in these instances, the advertisements may be displayed automatically.

At block 530, the method may display the selected content based on a time stored in the contact profile. As explained previously, birthdays, anniversaries, holidays, may all trigger the display of content. In addition, if the computer is a subsidized computer, content may be displayed periodically.

At block 535, the method may communicate the data in the contact profile 440 to an advertising manager that matches key words from the contact profile 440 to key words in content and communicates content that has key word matches. As explained previously, the Content Manager may be an intelligent component that attempts to locate content that it determines are relevant to the keywords in the contact profile 440.

At block 540, the method may provide the content that has the best match between the contact profile 440 and the content. Determining what is a best match may be a challenge. For example, emails that read "I hate tennis" contain the keyword tennis, but it clearly would be an error to serve content related to tennis. In addition, the method may learn from previous selections. For example, if a user normally spends $50 on a gift, gifts that are significantly more expensive may no longer be displayed to a user.

At block 545, the method may allow reviewing of the keywords stored in the contact profile 440. By reviewing the keywords, a user may get a better understanding why certain content is being displayed.

At block 550, the method may allow modification of the keywords stored in the contact profile 440. By reviewing, modifying and editing keywords, different content may be displayed. By emphasizing some words, removing words, adding words, more targeted and effective content may be displayed.

To step through an example, say a user's birthday is October 18. Often times, the user may not spend enough time searching for the perfect gift, and because the brother may be in Texas, and the user may often ship gifts late. With the social 360 context monitor 210 enabled, a contact profile 440 may have been building of Ralph, and the profile notes that Ralph's interests include golfing and fishing. As the user is writing and reading email, the user may receive content from the AdDisplay Manager 240 (FIG. 2) that may be served for Ralph's profile for a birthday present recommendation. The timing may arrive five days before his birthday, which will give the user time to order and have it shipped to him.

Say the user would like to find something a little different than the golf clubs and fishing rods suggested to the user, so the user may click on the option that allows the user to view a profile and add some additional interests 420 (FIG. 4). Quickly, the user may receive another couple of ads, and one may be the perfect birthday present and it will arrive in time, for the first time in many years. In another example, the user may know Ralph's birthday is just around the corner and may request to see, review and modify the keywords in Ralph's contact profile 440. Ads may then be served based on the data in the contact profile 440.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of storing contact data about a second person in an electronic contact profile by monitoring electronic computing activities of a first person on a first user computing device, the method comprising:

monitoring, using an electronic context monitor, electronic computing activities of the first person on the first user computing device to identify contact data about the second person from an interaction between the second person and the first person using the first user computing device, wherein the first person and the second person are different physical persons and the interaction comprises at least one of a message sent from the first person to the second person and a message received by the first person from the second person;

creating, based on the monitored electronic computing activities of the first person, an electronic contact profile of the second person who is not a user of the first user computing device, the electronic contact profile storing the contact data about the second person;

selecting content for presentation to the first person on the first user computing device based on the contact data stored in the electronic contact profile of the second person who is not a user of the first user computing device; and presenting the selected content to the first person on the first user computing device.

2. A method of claim 1, where the selected content comprises one or more advertisements.

3. A method of claim 2, further comprising one of automatically displaying a selected advertisement and selecting to view a selected advertisement.

4. A method of claim 2, further comprising displaying a selected advertisement based on a time stored in the electronic contact profile of the second person.

5. A method of claim 2, further comprising communicating the contact data in the electronic contact profile of the second person to an advertising manager that matches key words from the electronic contact profile of the second person to key words in advertisements, and receiving advertisements that have key word matches from the advertising manager.

6. A method of claim 5, further comprising receiving and displaying the advertisement that has the best match between the electronic contact profile of the second person and the advertisement.

7. A method of claim 1, wherein the context monitor is part of an operating system of the first user computing device.

8. A method of claim 1, wherein the context monitor is a web-based application.

9. A method of claim 1, wherein the contact data comprises keywords obtained from the message, the method further comprising:

providing a user interface to the first person that displays the keywords.

10. A method of claim 9, further comprising receiving a user keyword modification input through the user interface, and, in response, modifying one or more of the keywords stored in the electronic contact profile of the second person.

11. A method of claim 1, wherein the electronic context monitor comprises an application that operates on the first user computing, device to monitor at least one of:

File open events;
Notification events;
Window titles;
Web page content;
Internet history;
Keyboard input;
Print events;
Date events;
Event log; and
System events.

12. A computer-readable storage medium having computer-executable instructions which, when executed, implement a method for storing contact data about a second person, who is not a user of a first computer used by a first person, the method comprising:

accessing an electronic contact profile for the second person who is not a user of the first computer;

monitoring messages between the second person and the first person using an electronic context monitor to determine keywords, from the messages, pertaining to the second person, wherein the first person and the second person are different physical persons; and     storing the keywords determined from the messages in the electronic contact profile for the second person, the electronic contact profile being stored for access by the first person using the first computer;

receiving, from the first person, a profile modification input through a user interface on the first computer and, in response, modifying one or more of the keywords stored in the electronic contact profile for the second person;

selecting an advertisement for delivery to the first person on the first computer based on the modified keywords stored in the electronic contact profile for the second person who is not a user of the first computer; and     displaying the advertisement to the first person on the first computer.

13. The computer readable medium of claim 12, further comprising computer executable code for communicating the keywords in the electronic contact profile for the second person to an advertising manager that matches the keywords to keywords in advertisements, and receiving advertisements that have keyword matches from the advertising manager.

14. The computer readable medium of claim 12, further comprising computer executable code for providing the advertisement that has the best match between the keywords in the electronic contact profile for the second person and the advertisement.

15. A method of creating an electronic contact profile of a second person that stores contact data about the second person by monitoring the electronic computing activities of a first person on a first user computing device, the method comprising:

accessing the electronic contact profile of the second person who is not a user of the first user computing device, the electronic contact profile storing at least one of a date and a time;

using an electronic context monitor on the first user computing device to monitor email communications between the second person and the first person using the first user computing device, wherein the first person and the second person are different physical persons;

storing in the electronic contact profile contact data about the second person based on terms identified within a body of the email communications between the second person and the first person monitored by the electronic context monitor;

communicating data in the electronic contact profile of the second person to an advertising manager;

receiving one or more advertisements from the advertising manager that are selected based on a match between keywords from the electronic contact profile of the second person and keywords in the advertisements; and     presenting, based on the at least one of a date and a time stored in the electronic contact profile, the selected one or more advertisements to the first person on the first user computing device.

16. The method of claim 15, further comprising receiving the one or more advertisements that have the best match to the keywords from the electronic contact profile of the second person.

17. The method of claim 15, providing the keywords stored in the electronic contact profile of the second person to the first person for review.

18. The method of claim 15, comprising displaying the keywords on the first user computing device and receiving an input from the first person that indicates a modification of one or more of the displayed keywords.

\* \* \* \* \*